US010187886B2

(12) United States Patent
Li et al.

(10) Patent No.: US 10,187,886 B2
(45) Date of Patent: Jan. 22, 2019

(54) DATA TRANSMISSION METHOD AND STATION

(71) Applicant: HUAWEI TECHNOLOGIES CO., LTD., Shenzhen (CN)

(72) Inventors: Bo Li, Xi'an (CN); Qiao Qu, Xi'an (CN); Yi Luo, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 23 days.

(21) Appl. No.: 15/270,390

(22) Filed: Sep. 20, 2016

(65) Prior Publication Data

US 2017/0013619 A1 Jan. 12, 2017

Related U.S. Application Data

(63) Continuation of application No. PCT/CN2014/073736, filed on Mar. 20, 2014.

(51) Int. Cl.

| | |
|---|---|
| ***H04W 72/04*** | (2009.01) |
| ***H04L 5/00*** | (2006.01) |
| ***H04W 74/00*** | (2009.01) |
| *H04W 88/02* | (2009.01) |
| *H04W 88/08* | (2009.01) |

(52) U.S. Cl.

CPC ....... *H04W 72/0446* (2013.01); *H04L 5/0007* (2013.01); *H04W 74/006* (2013.01); *H04W 88/02* (2013.01); *H04W 88/08* (2013.01)

(58) Field of Classification Search

None

See application file for complete search history.

(56) References Cited

U.S. PATENT DOCUMENTS

| | | | | |
|---|---|---|---|---|
| 6,285,662 | B1 * | 9/2001 | Watanabe ......... | H04W 74/0841 370/280 |
| 8,064,834 | B2 | 11/2011 | Kim et al. | |
| 8,155,102 | B1 | 4/2012 | Hakola et al. | |
| 8,467,728 | B2 | 6/2013 | Kim et al. | |
| 2003/0103521 | A1 * | 6/2003 | Raphaeli ................ | H04B 3/542 370/445 |
| 2006/0154680 | A1 | 7/2006 | Kroth et al. | |
| 2007/0207788 | A1 | 9/2007 | Phan et al. | |
| 2007/0264936 | A1 | 11/2007 | Kim et al. | |
| 2008/0144493 | A1 * | 6/2008 | Yeh ....................... | H04W 52/50 370/230 |

(Continued)

FOREIGN PATENT DOCUMENTS

| | | |
|---|---|---|
| CN | 101064922 A | 10/2007 |
| CN | 102055714 A | 5/2011 |

(Continued)

OTHER PUBLICATIONS

International Search Report (including English translation) issued in corresponding International Application No. PCT/CN2014/073736, dated Dec. 31, 2014, 8 pages.

(Continued)

*Primary Examiner* — Eunsook Choi

(74) *Attorney, Agent, or Firm* — Leydig, Voit & Mayer, Ltd.

(57) ABSTRACT

A data transmission method and a station are provided. In the method, the station receives an indication frame sent by an access point, where the indication frame is used to allocate a specified random contention channel. The station sends data over the specified random contention channel according to the indication frame and a random probability.

18 Claims, 4 Drawing Sheets

201 A station receives a random contention indication frame sent by an access point, where the indication frame includes frequency information of a specified random contention channel and random contention time information 202 Determine the specified random contention channel according to the frequency information that is of the random contention channel and included in the indication frame 203 Obtain a random contention time period according to the random contention time information included in the indication frame 204 Send data over the specified random contention channel according to a random probability within the random contention time period

(56) References Cited

U.S. PATENT DOCUMENTS

| | | | | |
|---|---|---|---|---|
| 2009/0316638 | A1* | 12/2009 | Yi | H04W 72/042 370/329 |
| 2010/0135240 | A1 | 6/2010 | Kim et al. | |
| 2011/0237265 | A1 | 9/2011 | Sugawara et al. | |
| 2011/0244907 | A1 | 10/2011 | Golaup et al. | |
| 2012/0230302 | A1* | 9/2012 | Calcev | H04W 74/085 370/336 |
| 2012/0300712 | A1 | 11/2012 | Hokola et al. | |
| 2012/0314619 | A1* | 12/2012 | Wiberg | H04W 74/006 370/254 |
| 2014/0153537 | A1 | 6/2014 | Kim et al. | |
| 2015/0103710 | A1* | 4/2015 | Lv | H04W 74/0816 370/311 |
| 2016/0285649 | A1 | 9/2016 | Luo et al. | |

FOREIGN PATENT DOCUMENTS

| | | | |
|---|---|---|---|
| CN | 102158932 | A | 8/2011 |
| CN | 103650622 | A | 3/2014 |
| EP | 2178321 | A1 | 4/2010 |
| EP | 2373110 | A2 | 10/2011 |
| EP | 3065349 | A1 | 9/2016 |
| WO | 2004043099 | A2 | 5/2004 |
| WO | 2007051910 | A1 | 5/2007 |
| WO | 2011102764 | A1 | 8/2011 |
| WO | 2012160510 | A1 | 11/2012 |

OTHER PUBLICATIONS

Extended European Search Report issued in corresponding EP Application No. 14886017, dated Jan. 26, 2017, 9 pages.

* cited by examiner

DATA TRANSMISSION METHOD AND STATION

CROSS-REFERENCE TO RELATED APPLICATION

This application is a continuation of International Patent Application No. PCT/CN2014/073736, filed on Mar. 20, 2014, which is hereby incorporated by reference in its entirety.

TECHNICAL FIELD

The present disclosure relates to the field of wireless communications technologies, and in particular, to a data transmission method and a station.

BACKGROUND

In existing wireless network communications, a random contention manner is generally adopted to perform data transmission by using an unlicensed spectrum. For example, in a network such as a wireless local area network (WLAN) or Bluetooth, the random contention manner is adopted to perform data transmission. When the random contention manner is adopted to perform data transmission, different wireless networks have equal status, different stations in a same wireless network also have equal status, and all stations share all random contention channels in the wireless network. When more stations are deployed in a wireless network, it indicates a longer average time for accessing a shared random contention channel by the stations. Consequently, service quality of a real-time service of the wireless network cannot be ensured.

SUMMARY

The present disclosure provides a data transmission method. By using the method, contention between stations can be reduced, thereby reducing a time for accessing a random contention channel by the stations.

In a first aspect, the disclosure provides a data transmission method. In the method, a station receives an indication frame sent by an access point, where the indication frame is used to allocate a specified random contention channel. The station sends data over the specified random contention channel according to the indication frame and a random probability.

In a second aspect, the disclosure provides a station. The station includes a receiving unit, configured to receive an indication frame sent by an access point, where the indication frame is used to specify a random contention channel. The station includes a sending unit, configured to send data over the specified random contention channel according to the indication frame received by the receiving unit and a random probability.

In the method of the present disclosure, a station sends data according to an indication frame over a random contention channel specified by the indication frame, which reduces contention between stations, thereby reducing a time for accessing the random contention channel by the stations, and improving network data transmission efficiency.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art according to the embodiments of the present disclosure without creative efforts shall fall within the protection scope of the present disclosure.

Figure 1:
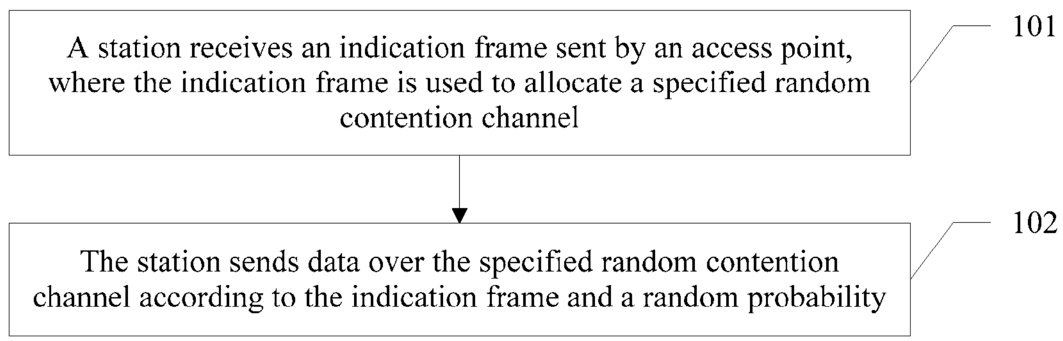
FIG. 1 is a schematic flowchart of a data transmission method according to an embodiment of the present disclosure.

As shown in FIG. 1, an embodiment of the present disclosure provides a data transmission method, where the data transmission method may be applied to a network based on an unlicensed frequency band, for example, a WLAN network or a Bluetooth network, and may be further applied to a network based on a licensed frequency band, for example, a Long Term Evolution (LTE) network, a Code Division Multiple Access (CDMA) network, or a Global System for Mobile Communications (GSM) network. Specifically, the data transmission method includes:

101. A station receives an indication frame sent by an access point, where the indication frame is used to allocate a specified random contention channel.

The access point may send the indication frame over all channels or some channels, where the indication frame may include channel frequency information of the specified random contention channel. The station may determine the specified random contention channel according to the channel frequency information of the specified random contention channel.

102. The station sends data over the specified random contention channel according to the indication frame and a random probability.

For example, the station sends the data over the specified random contention channel according to the channel frequency information of the specified random contention channel and the random probability.

The station may determine the specified random contention channel according to the indication frame, and then send the data over the specified random contention channel.

Therefore, according to the method, different random contention channels may be allocated to different stations for data transmission, which reduces contention between the stations and reduces a time for accessing the random contention channels by the stations, thereby ensuring service quality of a real-time service of a wireless network, and improving network data transmission efficiency.

The indication frame may further include random contention time information, and the station may obtain a random contention time period according to the random contention time information included in the indication frame. The station sends the data over the specified random contention channel according to the random probability within the random contention time period.

In this embodiment of the present disclosure, the station sends the data over the specified random contention channel according to the random probability, which may avoid a conflict occurring between the station and another station when the station accesses the specified random contention channel.

In addition, in this embodiment of the present disclosure, the specified random contention channel may occupy only a part of channel resources between the station and the access point, and the rest of the channel resources may be used by a channel for centralized scheduling and transmission. To make full use of the channel resources, this embodiment of the present disclosure may further use the following technical measures. Specifically, the indication frame sent by the access point and received by the station may be further used to allocate a channel used for centralized scheduling and transmission; and the station sends the data according to the indication frame over the channel used for centralized scheduling and transmission. Therefore, according to this embodiment of the present disclosure, the station can send the data according to the indication frame over both the specified random contention channel and the channel used for centralized scheduling and transmission. A manner in which the channel used for centralized scheduling and transmission is used to send data has an advantage of better service quality of a real-time service compared with a manner in which the specified random contention channel is used to send data, and therefore, according to the method in this embodiment of the present disclosure, the service quality of the real-time service can be further improved, and efficiency of a wireless system can be improved in a scenario of intensive station deployment and in a case of a large quantity of users.

For example, in a Wifi network, both a random contention channel and a channel used for centralized scheduling and transmission are configured. When a large quantity of user terminals perform wireless communication by using the Wifi network, a part of the terminals may send data by using channels used for centralized scheduling and transmission, that is, send data in a centralized scheduling and transmission mode over these channels, so as to ensure service quality of a real-time service. When the user terminals need to send a large amount of short packet data, a part of the terminals may send data by using random contention channels, that is, send data in a random contention mode over these channels, which may reduce a system overhead and improve system flexibility. In addition, the station sends the data over the specified random contention channel according to the random probability, and therefore, a probability of a conflict occurring when multiple stations use the specified random contention channel can be lowered.

Because the channel used for centralized scheduling and transmission includes a scheduling channel, to avoid mutual interference occurring when the data is sent over the scheduling channel and the random contention channel, the station may send the data in an orthogonal frequency division multiple access (OFDMA) manner over the specified random contention channel, where the random contention channel and the channel used for centralized scheduling and transmission have synchronous orthogonal frequency division multiplexing (OFDM) symbols.

The following embodiments are further enumerated to describe the present disclosure in detail.

Figure 2:
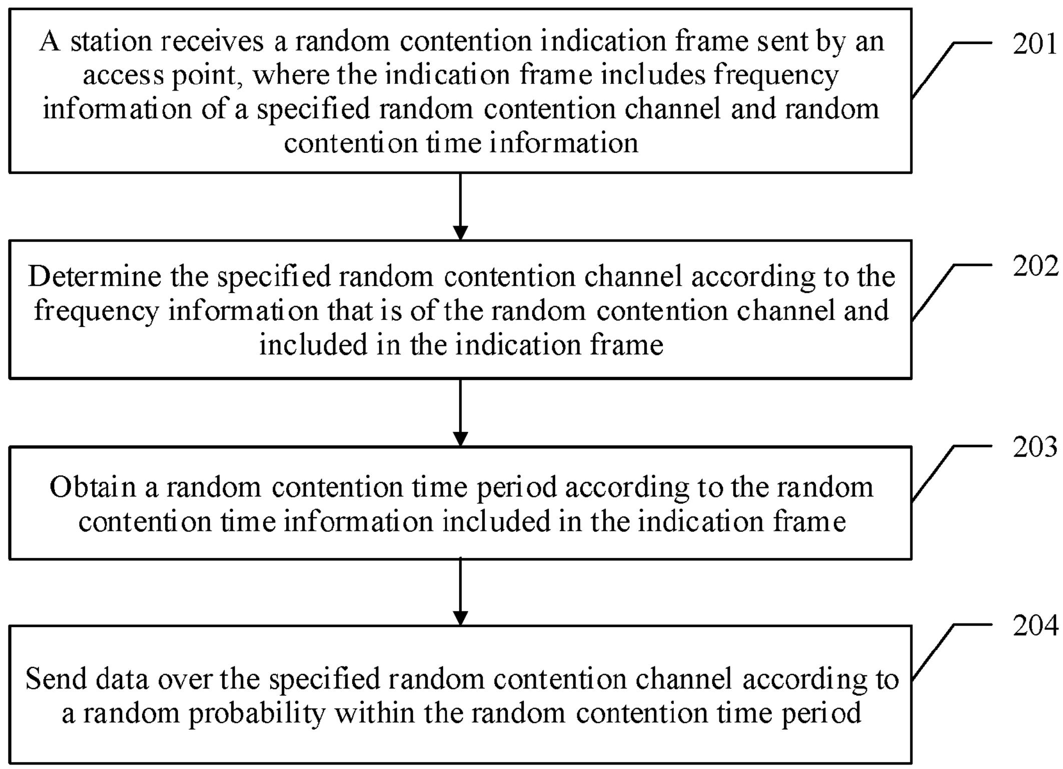
FIG. 2 is a schematic flowchart of another data transmission method according to an embodiment of the present disclosure.

As shown in FIG. 2, an embodiment of the present disclosure provides a data transmission method, and specific steps of the data transmission method include:

201. A station receives a random contention indication frame sent by an access point, where the indication frame includes channel frequency information of a specified random contention channel and random contention time information.

The access point may send the indication frame over all channels or some channels, and the indication frame is used to specify the random contention channel for the station.

202. Determine the specified random contention channel according to the channel frequency information that is of the random contention channel and included in the indication frame.

203. Obtain a random contention time period according to the random contention time information included in the indication frame.

204. Send data over the specified random contention channel according to a random probability within the random contention time period.

Specifically, the random contention time period may include a preset quantity of timeslots, and when the timeslot starts, the station sends the data over the specified random contention channel according to the random probability.

That when the timeslot starts, the station sends the data over the specified random contention channel according to the random probability includes:

when the timeslot starts, the station randomly selects a value within a preset value range; and when the selected value is less than a specified value, the station sends the data over the specified random contention channel within the timeslot; or when the selected value is equal to or greater than a specified value, the station does not send the data over the specified random contention channel within the timeslot.

Alternatively, that when the timeslot starts, the station sends the data over the specified random contention channel according to the random probability includes:

when the timeslot starts, the station randomly selects a value within a preset value range; and when the selected value is greater than or equal to a specified value, the station sends the data over the specified random contention channel; or when the selected value is less than a specified value, the station does not send the data over the specified random contention channel within the timeslot.

For example, the station may determine, according to a probability p, whether to send the data over the specified random contention channel within the random contention time period. Specifically, after the station receives the random contention indication frame, the station selects a random number from 0 to 1 before the random contention time period starts. If the selected random number is less than p, where p is greater than or equal to 0 and less than or equal to 1, the station sends a data frame over the specified random contention channel within the random contention time period; or if the selected random number is greater than or equal to p, the station does not send a data frame over the specified random contention channel within the random contention time period. It should be noted that the station may send a data frame when the selected random number is greater than or equal to p, and not send a data frame when the selected random number is less than p, which is not limited herein. Herein, the random number from 0 to 1 is taken as an example for description, and another random number may also be selected, which is not described herein any further.

In addition, the random contention time period may include a random contention time period, and there is a time interval between neighboring time periods. Each time period may include a preset quantity of timeslots, and when the timeslot starts, the station sends the data over the specified random contention channel according to the random probability. A specific implementation manner in which the station sends the data over the specified random contention channel according to the random probability is the same as the foregoing description manner, which is not described herein again.

In addition, in this embodiment of the present disclosure, the specified random contention channel may occupy only a part of channel resources between the station and the access point, and the rest of the channel resources may be used by a channel for centralized scheduling and transmission. To make full use of the channel resources, this embodiment of the present disclosure may further use the following technical measures. Specifically, the indication frame sent by the access point and received by the station may be further used to allocate a channel used for centralized scheduling and transmission; and the station sends the data according to the indication frame over the channel used for centralized scheduling and transmission. Therefore, according to this embodiment of the present disclosure, the station can send the data according to the indication frame over both the specified random contention channel and the channel used for centralized scheduling and transmission. A manner in which the channel used for centralized scheduling and transmission is used to send data has an advantage of better service quality of a real-time service compared with a manner in which the specified random contention channel is used to send data, and therefore, according to the method in this embodiment of the present disclosure, the service quality of the real-time service can be further improved, and efficiency of a wireless system can be improved in a scenario of intensive station deployment and in a case of a large quantity of users.

For example, in a Wifi network, both a random contention channel and a channel used for centralized scheduling and transmission are configured. When a large quantity of user terminals perform wireless communication by using the Wifi network, a part of the terminals may send data by using channels used for centralized scheduling and transmission, that is, send data in a centralized scheduling and transmission mode over these channels, so as to ensure service quality of a real-time service. When the user terminals need to send a large amount of short packet data, a part of the terminals may send data by using random contention channels, that is, send data in a random contention mode over these channels, which may reduce a system overhead and improve system flexibility. In addition, the station sends the data over the specified random contention channel according to the random probability, and therefore, a probability of a conflict occurring when multiple stations use the specified random contention channel can be lowered.

Because the channel used for centralized scheduling and transmission includes a scheduling channel, to avoid mutual interference occurring when the data is sent over the scheduling channel and the random contention channel, the station may send the data in an OFDMA manner over the specified random contention channel, where the random contention channel and the channel used for centralized scheduling and transmission have synchronous OFDM symbols.

To make the present disclosure more comprehensible, the foregoing content is further described with reference to the following specific application scenarios.

Figure 3:
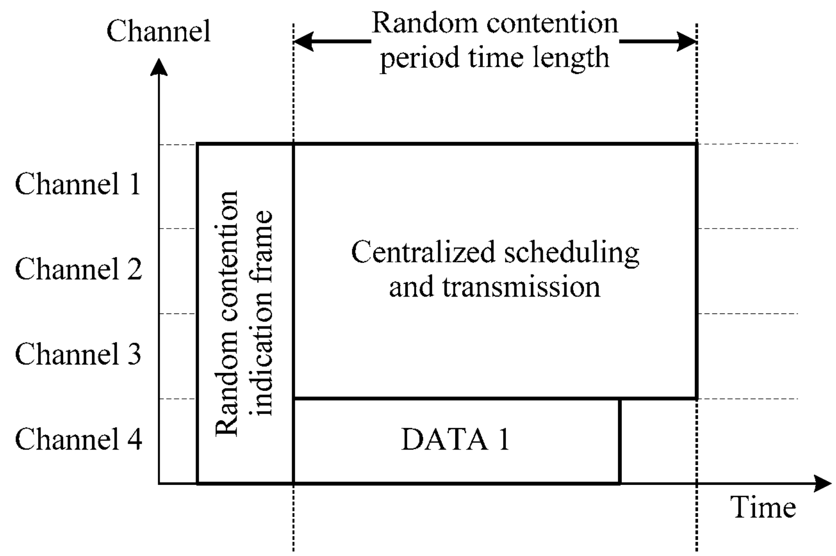
FIG. 3 is a schematic diagram of data transmission in an application scenario according to an embodiment of the present disclosure.

For example, it is assumed that one access point and two stations are disposed in a network, where the two stations are respectively station STA1 and station STA2, and both the two stations need to send data over a random contention channel. There are four available channels in the network, respectively, channel 1, channel 2, channel 3, and channel 4. As shown in FIG. 3, a specific data transmission process is as follows:

Step 1: The access point generates and sends a random contention indication frame, where the random contention indication frame includes channel frequency information of a specified random contention channel and random contention time information. Herein, the random contention time information is used to make the stations send data within a specified random contention time period, where the random contention time information may include a start time point of the random contention time period and a random contention time period length, or the random contention time information may include a random contention window.

The access point may send the random contention indication frame over all the four channels in the network, or may send the random contention indication frame over only one channel, for example, over only channel 4. In the random contention indication frame, channel 4 is specified as the random contention channel, and the random contention time period length is set.

After step 1 is performed, step 2 is performed.

Figure 4:
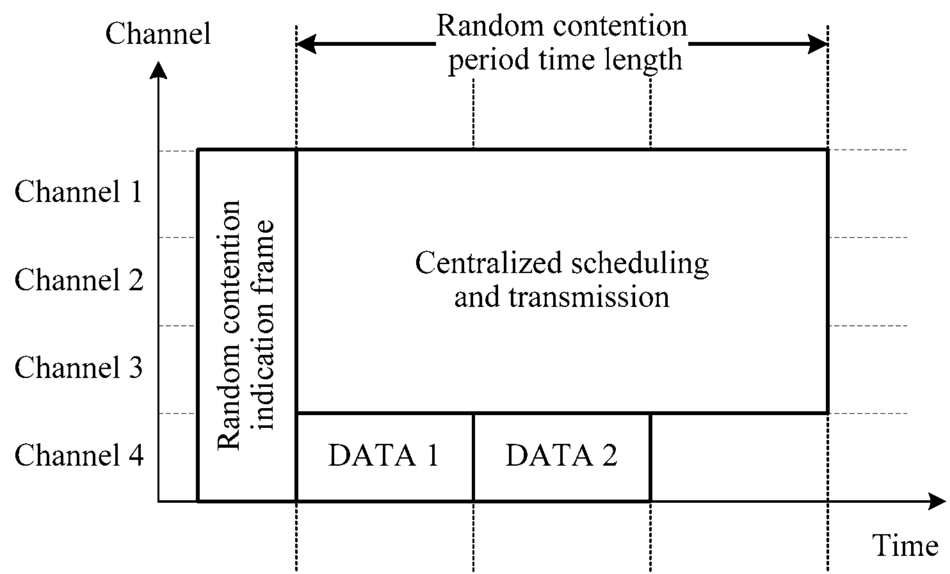
FIG. 4 is a schematic diagram of data transmission in another application scenario according to an embodiment of the present disclosure.

Step 2: STA1 and STA2 receive the random contention indication frame. STA1 obtains, according to the received random contention indication frame, a timeslot that is used to send the data over the specified random contention channel. STA2 obtains, according to the received random contention indication frame, a timeslot that is used to send the data over the specified random contention channel. In FIG. 4, one random contention time period includes three timeslots, and STA1 and STA2 may send the data over the specified random contention channel within the first timeslot or the second timeslot.

After step 2 is performed, step 3 is performed.

Step 3: STA1 and STA2 randomly select random numbers, where if a random number randomly selected by STA1 is less than p, STA1 sends a frame DATA1 within the random contention time period by using channel 4, while if a random number randomly selected by STA2 is greater than p, STA2 does not send a frame DATA2 within the random contention time period by using channel 4, thereby avoiding a conflict occurring when the data is sent over the specified random contention channel.

It should be noted that STA1 may send a data frame, by using channel 4, when a selected random number is greater than or equal to p, and STA2 does not send a data frame when a selected data is less than p, which is not limited herein.

For another example, it is assumed that one access point and two stations are disposed in a network, where the two stations are respectively station STA1 and station STA2, and both the two stations need to send data over a random contention channel. There are four available channels in the network, respectively, channel 1, channel 2, channel 3, and channel 4. As shown in FIG. 4, a specific data transmission process is as follows:

Step 1: The access point generates and sends a random contention indication frame, where the random contention indication frame includes channel frequency information of a specified random contention channel and random contention time information. Herein, the random contention time information is used to make the stations send the data within a specified random contention time period, where the random contention time information may include a random contention time period, the random contention time period may be divided into several timeslots, and the stations need to send data frames within the timeslots. The access point may send the random contention indication frame over all the four channels in the network, or may send the random contention indication frame over only one channel, for example, over only channel 4.

After step 1 is performed, step 2 is performed.

Step 2: STA1 and STA2 receive the random contention indication frame. STA1 obtains, according to the received random contention indication frame, a timeslot that is used to send the data over the specified random contention channel. STA2 obtains, according to the received random contention indication frame, a timeslot that is used to send the data over the specified random contention channel. In FIG. 4, one random contention time period includes three timeslots, and STA1 and STA2 may send the data over the specified random contention channel within the first timeslot or the second timeslot.

After step 2 is performed, step 3 is performed.

Step 3: When the first timeslot of the random contention time period starts, if a random number randomly selected by STA1 is less than p, STA1 sends a frame DATA1 over the specified random contention channel within the first timeslot, while if a random number randomly selected by STA2 is greater than p, STA2 does not send a frame DATA2 over the specified random contention channel within the first timeslot.

After step 3 is performed, step 4 is performed.

Step 4: When the second timeslot of the random contention time period starts, if a random number randomly selected by STA2 is less than p, STA2 sends the frame DATA2.

Because a channel used for centralized scheduling and transmission includes a scheduling channel, to avoid mutual interference occurring when the data is sent over the scheduling channel and the random contention channel, the stations may send the data in an orthogonal frequency division multiple access OFDMA manner over the selected random contention channel according to a random probability within the random contention time period, where the random contention channel and the channel used for centralized scheduling and transmission have synchronous orthogonal frequency division multiplexing OFDM symbols.

In this embodiment of the present disclosure, the random contention indication frame may include random contention time information, where the random contention time information is used to indicate a random contention time period that the station has, and the station may send the data within the random contention time period. After receiving the random contention indication frame, the station may obtain, according to the random contention time information included in the random contention indication frame, a random contention time period during which the station sends the data over the specified random contention channel; and send the data over the specified random contention channel within the random contention time period. Therefore, the access point sends a random contention indication frame once, so that the station can send the data within the random contention time period, thereby reducing a quantity of times of sending a random indication frame.

The foregoing content is further described with reference to the following specific application scenario.

Figure 5:
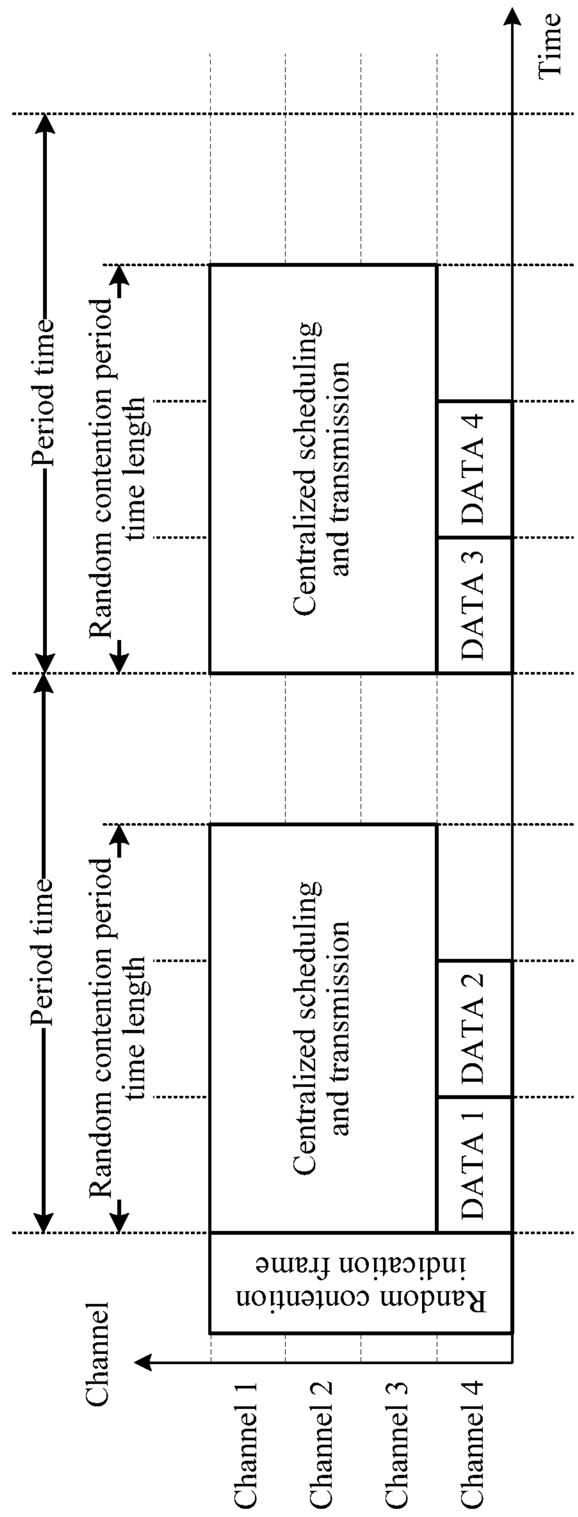
FIG. 5 is a schematic diagram of data transmission in still another application scenario according to an embodiment of the present disclosure.

For example, it is assumed that one access point and two stations are disposed in a network, where the two stations are respectively station STA1 and station STA2, and both the two stations need to send periodical service data over a random contention channel. There are four available channels in the network, respectively, channel 1, channel 2, channel 3, and channel 4. As shown in FIG. 5, a specific data transmission process is as follows:

Step 1: The access point generates and sends a random contention indication frame, where the random contention indication frame includes channel frequency information of a specified random contention channel and random contention time information, the random contention time information includes a random contention time period, and the random contention time period may be divided into several timeslots. The access point may send the random contention indication frame over all the four channels in the network, or may send the random contention indication frame over only one channel, for example, over only channel 4. In FIG. 5, the random contention time period includes a random contention time period and an interval time, where the random contention time period includes three timeslots, and the stations may send the data within the first timeslot and the second timeslot in the three timeslots.

After step 1 is performed, step 2 is performed.

Step 2: STA1 and STA2 receive the random contention indication frame, determine channel 4 as the specified random contention channel according to the channel frequency information included in the random contention indication frame, and obtain the random contention time period according to the random contention time information included in the random contention indication frame. Within the first random contention time period, STA1 needs to send a frame DATA1, and STA2 needs to send a frame DATA2.

After step 2 is performed, step 3 is performed.

Step 3: When the first timeslot of the first random contention time period starts, if a random number randomly selected by STA1 is less than p, STA1 sends the frame DATA1 over channel 4, while if a random number randomly selected by STA2 is greater than p, STA2 does not send the frame DATA2 over channel 4.

After step 3 is performed, step 4 is performed.

Step 4: When the second timeslot of the first random contention time period starts, if a random number randomly selected by STA2 is less than p, STA2 sends the frame DATA2 over channel 4.

After step 4 is performed, step 5 is performed.

Step 5: STA1 and STA2 wait to enter a next random contention time period.

After step 5 is performed, step 6 is performed.

Step 6: After entering the second random contention time period, STA1 needs to send a frame DATA3, and STA2 needs to send a frame DATA4. When the first timeslot of the random contention time period starts, if a random number randomly selected by STA1 is less than p, STA1 sends the frame DATA3 over channel 4, while if a random number randomly selected by STA2 is greater than p, STA2 does not send the frame DATA4 over channel 4.

After step 6 is performed, step 7 is performed.

Step 7: When the second timeslot of the second random contention time period starts, if a random number randomly selected by STA2 is less than p, STA2 sends the frame DATA4 over channel 4.

After step 7 is performed, the third random contention time period may be entered, and a process in which STA1 and STA2 send a data frame within the third random contention time period is the same as a process in which STA1 and STA2 send a data frame within the first or the second random contention time period, which is not described herein again.

In addition, it should be further noted that the station in this embodiment of the present disclosure may send the data to the access point or another station over the specified random contention channel, that is, the station not only can send the data to the access point by using the foregoing method, but also can send the data to the another station by using the foregoing method.

Figure 6:
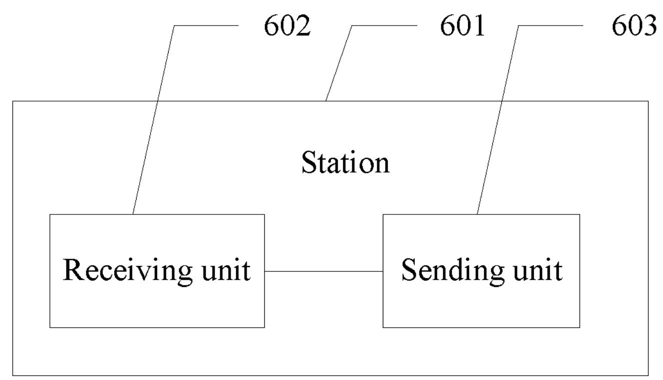
FIG. 6 is a structural block diagram of a station according to an embodiment of the present disclosure.

As shown in FIG. 6, an embodiment of the present disclosure further provides a station 601, where the station 601 may be applied to a network based on an unlicensed frequency band, for example, a WLAN network or a Bluetooth network, and may be further applied to a network based on a licensed frequency band, for example, an LTE network, a CDMA network, or a GSM network. The station 601 may specifically include:

a receiving unit 602, configured to receive an indication frame sent by an access point, where the indication frame is used to specify a random contention channel; and a sending unit 603, configured to send data over the specified random contention channel according to the indication frame received by the receiving unit 602 and a random probability.

When the station needs to access a channel to send data, contention between the station and another station can be reduced, which reduces a time for accessing the random contention channel by the station, thereby improving network data transmission efficiency.

Optionally, that the receiving unit 602 is configured to receive the indication frame sent by the access point includes:

configured to receive the indication frame sent by the access point, where the indication frame includes channel frequency information of the specified random contention channel; and that the sending unit 603 is configured to send the data over the specified random contention channel according to the indication frame received by the receiving unit 602 and the random probability includes:

configured to determine the specified random contention channel according to the channel frequency information of the specified random contention channel; and send the data over the specified random contention channel according to the random probability after determining the specified random contention channel.

Optionally, that the receiving unit 602 is configured to receive the indication frame sent by the access point includes:

configured to receive the indication frame sent by the access point, where the indication frame includes random contention time information; and that the sending unit 603 is configured to send the data over the specified random contention channel according to the indication frame received by the receiving unit 602 and the random probability includes:

configured to obtain a random contention time period according to the random contention time information included in the indication frame; and send the data over the specified random contention channel according to the random probability within the random contention time period.

Optionally, that the sending unit 603 is configured to obtain the random contention time period according to the random contention time information included in the indication frame; and send the data over the specified random contention channel according to the random probability within the random contention time period includes:

configured to obtain a random contention time period according to the random contention time information included in the indication frame, where the random contention time period includes the random contention time period; and send the data over the specified random contention channel according to the random probability within the random contention time period.

Optionally, the random contention time period includes a preset quantity of timeslots; and that the sending unit 603 is configured to send the data over the specified random contention channel according to the random probability within the random contention time period includes:

configured to: when the timeslot starts, send the data over the specified random contention channel according to the random probability.

Optionally, that the sending unit 603 is configured to: when the timeslot starts, send the data over the specified random contention channel according to the random probability includes:

configured to: when the timeslot starts, randomly select a value within a preset value range; and when the selected value is less than a specified value, send the data over the specified random contention channel within the timeslot, or when the selected value is equal to or greater than a specified value, skip sending the data over the specified random contention channel within the timeslot.

Optionally, that the sending unit 603 is configured to: when the timeslot starts, send the data over the specified random contention channel according to the random probability includes:

configured to: when the timeslot starts, randomly select a value within a preset value range; and when the selected value is greater than or equal to a specified value, send the data over the specified random contention channel, or when the selected value is less than a specified value, skip sending the data over the specified random contention channel within the timeslot.

Optionally, that the receiving unit 602 is configured to receive the indication frame sent by the access point includes:

configured to receive the indication frame sent by the access point, where the indication frame is further used to allocate a channel used for centralized scheduling and transmission; and the sending unit 603 is further configured to send the data according to the indication frame over the channel used for centralized scheduling and transmission.

Therefore, the station provided in this embodiment of the present disclosure can send data according to the indication frame over both the specified random contention channel and the channel used for centralized scheduling and transmission. A manner in which the channel used for centralized scheduling and transmission is used to send data has an advantage of better service quality of a real-time service compared with a manner in which the specified random contention channel is used to send data, and therefore, when the station provided in this embodiment of the present disclosure is applied to the method of the present disclosure, the service quality of the real-time service can be further improved, and efficiency of a wireless system can be improved in a scenario of intensive station deployment and in a case of a large quantity of users.

Optionally, that the sending unit 603 is configured to send the data over the specified random contention channel according to the indication frame and the random probability includes:

configured to send the data in an orthogonal frequency division multiple access OFDMA manner over the specified random contention channel according to the random probability, where the random contention channel and the channel used for centralized scheduling and transmission have synchronous orthogonal frequency division multiplexing OFDM symbols.

Optionally, that the sending unit 603 is configured to send the data over the specified random contention channel according to the random probability includes:

configured to send the data to the access point or another station over the specified random contention channel according to the random probability.

Figure 7:
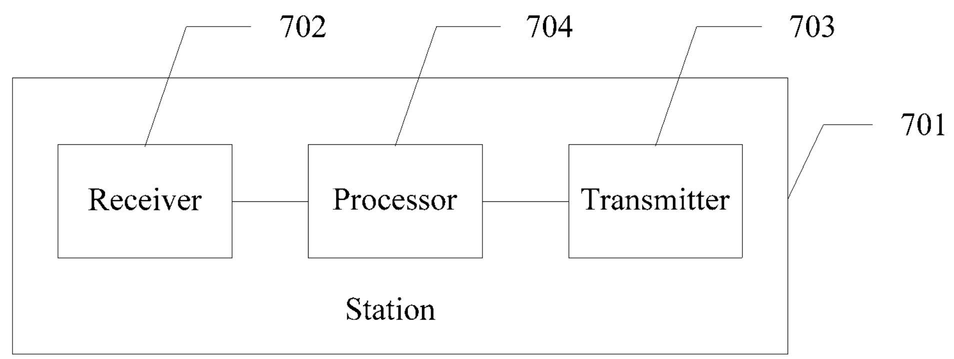
FIG. 7 is a structural block diagram of another station according to an embodiment of the present disclosure.

As shown in FIG. 7, an embodiment of the present disclosure provides a station 701, where the station 701 may be applied to a network based on an unlicensed frequency band, for example, a WLAN network or a Bluetooth network, and may be further applied to a network based on a licensed frequency band, for example, an LTE network, a CDMA network, or a GSM network. The station 701 may specifically include: a receiver 702, a transmitter 703, and a processor 704, where the processor 704 separately connects to the receiver 702 and the transmitter 703. The receiver 702 is configured to receive an indication frame sent by an access point, where the indication frame is used to specify a random contention channel; the processor 704 is configured to control, according to the indication frame received by the receiver 702, the transmitter 703 to send data over the random contention channel specified by the indication frame; and the transmitter 703 is configured to send the data over the specified random contention channel according to a random probability.

When the station needs to access a channel to send data, contention between the station and another station can be reduced, which reduces a time for accessing the random contention channel by the station, thereby improving network data transmission efficiency.

Optionally, that the receiver 702 is configured to receive the indication frame sent by the access point includes: configured to receive the indication frame sent by the access point, where the indication frame includes channel frequency information of the specified random contention channel; and that the processor 704 is configured to control, according to the indication frame received by the receiver 702, the transmitter 703 to send the data over the random contention channel specified by the indication frame includes: configured to control, according to the channel frequency information that is of the specified random contention channel and included in the indication frame received by the receiver 702, the transmitter 703 to send the data over the specified random contention channel.

Optionally, that the receiver 702 is configured to receive the indication frame sent by the access point includes: configured to receive the indication frame sent by the access point, where the indication frame includes random contention time information;

the processor 704 is configured to obtain a random contention time period according to the random contention time information included in the indication frame received by the receiver 702; and that the transmitter 703 is configured to send the data over the specified random contention channel according to the random probability includes:

configured to send the data over the specified random contention channel according to the random probability within the random contention time period obtained by the processor 704.

Optionally, the processor 704 is configured to obtain a random contention time period according to the random contention time information included in the indication frame received by the receiver 702; and that the transmitter 703 is configured to send the data over the specified random contention channel according to the random probability within the random contention time period obtained by the processor 704 includes:

configured to send the data over the specified random contention channel according to the random probability within the random contention time period obtained by the processor 704.

Optionally, the random contention time period includes a preset quantity of timeslots; and that the transmitter 703 is configured to send the data over the specified random contention channel according to the random probability within the random contention time period obtained by the processor 704 includes:

configured to: when the timeslot starts, send the data over the specified random contention channel according to the random probability.

Optionally, that the transmitter 703 is configured to: when the timeslot starts, send the data over the specified random contention channel according to the random probability includes:

configured to: when the timeslot starts, randomly select a value within a preset value range; and when the selected value is less than a specified value, send the data over the specified random contention channel within the timeslot, or when the selected value is equal to or greater than a specified value, skip sending the data over the specified random contention channel within the timeslot.

Optionally, that the transmitter 703 is configured to: when the timeslot starts, send the data over the specified random contention channel according to the random probability includes:

configured to: when the timeslot starts, randomly select a value within a preset value range; and when the selected value is greater than or equal to a specified value, send the data over the specified random contention channel, or when the selected value is less than a specified value, skip sending the data over the specified random contention channel within the timeslot.

Optionally, that the receiver 702 is configured to receive the indication frame sent by the access point includes: configured to receive the indication frame sent by the access point, where the indication frame is further used to allocate a channel used for centralized scheduling and transmission;

the processor 704 is further configured to control, according to the indication frame, the transmitter 703 to send the data over the channel that is allocated by using the indication frame and used for centralized scheduling and transmission; and the transmitter 703 is further configured to send the data over the channel used for centralized scheduling and transmission.

Optionally, that the transmitter 703 is configured to send the data over the specified random contention channel according to the random probability includes:

configured to send the data in an orthogonal frequency division multiple access OFDMA manner over the specified random contention channel according to the random probability, where the random contention channel and the channel used for centralized scheduling and transmission have synchronous orthogonal frequency division multiplexing OFDM symbols.

Therefore, the station can send the data according to the indication frame over both the specified random contention channel and the channel used for centralized scheduling and transmission. A manner in which the channel used for centralized scheduling and transmission is used to send data has an advantage of better service quality of a real-time service compared with a manner in which the specified random contention channel is used to send data, and therefore, when the station provided in this embodiment of the present disclosure is applied to the method of the present disclosure, the service quality of the real-time service can be further improved, and efficiency of a wireless system can be improved in a scenario of intensive station deployment and in a case of a large quantity of users.

Optionally, that the transmitter 703 is configured to send the data over the specified random contention channel according to the random probability includes: configured to send the data to the access point or another station over the specified random contention channel according to the random probability.

In specific implementation, the present disclosure further provides a computer storage medium, where the computer storage medium may store a program, and, when the program is being executed, a part or all of the steps of each embodiment of the data transmission method provided in the present disclosure may be performed. The foregoing storage medium may be a magnetic disk, an optical disc, a read-only memory (ROM), a random access memory (RAM), or the like.

The foregoing provides a detailed description about the data transmission method and the station provided in embodiments of the present disclosure. In this specification, specific examples are used to describe the principle and implementation manners of the present disclosure, and the description of the embodiments is only intended to help understand the method and core idea of the present disclosure. Meanwhile, a person of ordinary skill in the art may, according to the idea of the present disclosure, make modifications with respect to the specific implementation manners and the application scope. Therefore, the content of this specification shall not be construed as a limitation to the present disclosure.

What is claimed is:

1. A data transmission method comprising:

receiving, by a station, an indication frame sent by an access point, wherein the indication frame is used to allocate a random contention channel; and sending, by the station, data over the random contention channel according to the indication frame and a random probability, including:

obtaining a random contention time period according to random contention time information in the indication frame, wherein the random contention time period comprises a quantity of timeslots;

randomly selecting a value within a range of values for a timeslot among the quantity of timeslots;

when the randomly selected value is less than a specified value, sending the data over the random contention channel within the timeslot; and when the selected value is equal to or greater than a specified value, not sending the data over the random contention channel within the timeslot.

2. The data transmission method according to claim 1, wherein receiving, by a station, an indication frame sent by an access point comprises:

receiving, by the station, the indication frame sent by the access point, wherein the indication frame comprises channel frequency information of the random contention channel; and the sending, by the station, data over the random contention channel according to the indication frame and the random probability comprises:

determining the random contention channel according to the channel frequency information of the random contention channel; and sending, by the station, the data over the random contention channel according to the random probability after determining the random contention channel.

3. The data transmission method according to claim 1, wherein sending, by the station when the timeslot starts, the data over the random contention channel according to the random probability comprises:

randomly selecting, by the station when the timeslot starts, a value within a preset value range; and sending, by the station when the selected value is greater than or equal to a specified value, the data over the random contention channel; and, by the station when the selected value is less than the specified value, not sending the data over the random contention channel within the timeslot.

4. The data transmission method according to claim 1, wherein the indication frame is further used to allocate a channel used for centralized scheduling and transmission; and the method further comprises: sending, by the station, the data according to the indication frame over the channel used for centralized scheduling and transmission.

5. The data transmission method according to claim 4, wherein sending, by the station, data over the random contention channel according to the indication frame and the random probability comprises:

sending the data in an orthogonal frequency division multiple access (OFDMA) manner over the random contention channel according to the random probability, wherein the random contention channel and the channel used for centralized scheduling and transmission have synchronous orthogonal frequency division multiplexing (OFDM) symbols.

6. The data transmission method according to claim 1, wherein sending, by the station, data over the random contention channel according to the random probability comprises:

sending, by the station, the data to the access point or another station over the random contention channel according to the random probability.

7. A station comprising:

a receiver configured to receive an indication frame sent by an access point, wherein the indication frame is used to specify a random contention channel; and a transmitter configured to send data over the random contention channel according to the indication frame received by the receiver and a random probability, including:

obtaining a random contention time period according to random contention time information in the indication frame, wherein the random contention time period comprises a quantity of timeslots;

randomly selecting a value within a range of values for a timeslot among the quantity of timeslots;

when the randomly selected value is less than a specified value, sending the data over the random contention channel within the timeslot; and when the selected value is equal to or greater than a specified value, not sending the data over the random contention channel within the timeslot.

8. The station according to claim 7, wherein the receiver is configured to receive the indication frame sent by the access point, wherein the indication frame comprises channel frequency information of the random contention channel; and the transmitter is configured to determine the random contention channel according to the channel frequency information of the random contention channel; and send the data over the random contention channel according to the random probability after determining the random contention channel.

9. The station according to claim 7, wherein the transmitter is configured to:

when the timeslot starts, randomly select a value within a preset value range;

when the selected value is greater than or equal to a specified value, send the data over the random contention channel, and when the selected value is less than a specified value, not send the data over the random contention channel within the timeslot.

10. The station according to claim 7, wherein the receiver is configured to receive the indication frame sent by the access point, wherein the indication frame is further used to allocate a channel used for centralized scheduling and transmission; and the transmitter is further configured to send the data according to the indication frame over the channel used for centralized scheduling and transmission.

11. The station according to claim 10, wherein the transmitter is configured to send the data in an orthogonal frequency division multiple access (OFDMA) manner over the random contention channel according to the random probability, wherein the random contention channel and the channel used for centralized scheduling and transmission have synchronous orthogonal frequency division multiplexing (OFDM) symbols.

12. The station according to claim 7, wherein the transmitter is configured to send the data to the access point or another station over the random contention channel according to the random probability.

13. A non-transitory, computer readable medium storing instructions for execution by a processor, the instructions comprising:

instructions for receiving an indication frame sent by an access point, wherein the indication frame is used to allocate a random contention channel; and instructions for sending data over the random contention channel according to the indication frame and a random probability, including:

obtaining a random contention time period according to random contention time information in the indication frame, wherein the random contention time period comprises a quantity of timeslots;

randomly selecting a value within a range of values for a timeslot among the quantity of timeslots;

when the randomly selected value is less than a specified value, sending the data over the random contention channel within the timeslot; and when the selected value is equal to or greater than a specified value, not sending the data over the random contention channel within the timeslot.

14. The non-transitory computer readable medium according to claim 13, wherein the instructions of receiving the indication frame comprise:

receiving the indication frame sent by the access point, wherein the indication frame comprises channel frequency information of the random contention channel; and wherein the instructions of sending the data over the random contention channel according to the indication frame and the random probability comprise:

determining the random contention channel according to the channel frequency information of the random contention channel; and sending the data over the random contention channel according to the random probability after determining the random contention channel.

15. The non-transitory computer readable medium according to claim 13, wherein the instructions of sending the data over the random contention channel according to the random probability when the timeslot starts comprise:

randomly selecting, when the timeslot starts, a value within a preset value range; and sending, by the station when the selected value is greater than or equal to a specified value, the data over the random contention channel; and not sending, by the station when the selected value is less than the specified value, the data over the random contention channel within the timeslot.

16. The non-transitory computer readable medium according to claim 13, wherein the indication frame is further used to allocate a channel used for centralized scheduling and transmission; and the instructions further comprise: sending the data according to the indication frame over the channel used for centralized scheduling and transmission.

17. The non-transitory computer readable medium according to claim 13, wherein the instructions of sending the data over the random contention channel according to the indication frame and the random probability comprise:

sending the data in an orthogonal frequency division multiple access (OFDMA) manner over the random contention channel according to the random probability, wherein the random contention channel and the channel used for centralized scheduling and transmission have synchronous orthogonal frequency division multiplexing (OFDM) symbols.

18. The non-transitory computer readable medium according to claim 13, wherein the instructions of sending the data over the random contention channel according to the random probability comprise:

sending the data to the access point or another station over the random contention channel according to the random probability.

* * * * *